Patented May 11, 1943

2,318,783

UNITED STATES PATENT OFFICE 2,318,783

PREPARATION OF COPPER PHTHALOCYANINES

Victor L. King and James W. Foote, Bound Brook, and Don H. W. Felch, Plainfield, N. J., assignors to American Cyanamid Company, New York, N. Y., a corporation of Maine No Drawing. Application February 28, 1941,
Serial No. 381,130

9 Claims. (Cl. 260—314)

This invention relates to an improved process of producing pigments of the copper phthalocyanine series from aromatic o-dinitriles.

Many processes have been proposed for producing copper phthalocyanine pigments from aromatic o-dinitriles. The problem is not a simple one; the reaction is highly exothermic and difficulties are encountered when no solvent or diluent is used. When copper halides are used with a diluent only a portion of the copper is utilized in actually forming a halogen-free pigment, part of it being employed to react with the halogen set free. This will be shown by consideration of the standard reaction according to the prior art for producing copper phthalocyanines by a reaction of phthalonitrile and cuprous chloride at temperatures under 180° C. The reaction proceeds as follows:

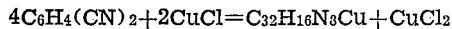

4C₆H₄(CN)₂+2CuCl=C₃₂H₁₆N₈Cu+CuCl₂

It will be noted that 100% excess of cuprous chloride is used over that necessary to supply the amount of copper actually entering into the pigment molecule. The second molecule of cuprous chloride performs the function of a chlorine acceptor. At higher temperatures the cupric chloride formed also reacts and in this case the pigment itself acts as the chlorine acceptor and chlorinated pigments are produced. In fact, in the past it has not been possible to produce an unchlorinated pigment using cupric chloride as the only cupriferous agent.

In the copending application of Harold T. Lacey, Serial No. 299,262, filed October 13, 1939, there is described and claimed a process in which phthalonitrile or a similar aromatic o-dinitrile is reacted with cupric chloride in an inert organic diluent and in the presence of sufficient ammonia so that the ammonia reacts with the chlorine set free in the reaction, part being oxidized to nitrogen and hence reducing chlorine to hydrogen chlorine which then reacts with the rest of the ammonia to form ammonium chloride. This was the first successful process using cupric halides to produce a halogen-free copper phthalocyanine pigment. In spite of the excellent yields from phthalonitrile and complete utilization of the copper, it is open to a technical disadvantage. The reaction mixture is corrosive and therefore the reaction had to be carried out in an enameled vessel, increasing the cost of equipment quite considerably.

In the copending application of Harold T. Lacey, Serial No. 381,136, filed February 28, 1941, an improvement on the earlier Lacey process is described and claimed in which cupric sulfate is used in place of cupric chloride. Hitherto cupric sulfate had never been used in any practical process for making pigments of the phthalocyanine type from aromatic o-dinitriles. The reaction of the ammonia appeared to be the same as in the cupric chloride ammonia process referred to above and high yields of unchlorinated pigments are thus obtainable without unduly corrosive reaction mixtures so that much cheaper materials of construction may be used such as for example ordinary stainless steel.

Our invention represents an improvement on the process claimed in the copending application of Lacey's Serial No. 381,136. Lacey describes the desirability of an anhydrous reaction mixture which is obtained among other means, by passing anhydrous ammonia through the solution containing a hydrated copper sulfate at about 105–110° C. which removes the water of crystallization from the sulfate and renders the reaction mixture anhydrous. In order to maintain the necessary excess of ammonia, Lacey proposes to pass ammonia continuously through the reaction mixture with or without recycling, in order to recover the excess ammonia. Both of these procedures require additional equipment for the recirculation of the ammonia and increase to a considerable extent the ammonia losses. They therefore represent a commercial disadvantage to the modification described by Lacey although in the technical results as far as yields, purity of product, and the like, are concerned, the Lacey process leaves little or nothing to be desired.

The process of our invention utilizes anhydrous copper sulfate which requires no passage of ammonia through the reaction mixture in order to dehydrate and uses an autoclave so that a relatively small amount of excess ammonia in the form of an atmosphere of ammonia may be used. Both of these procedures save ammonia and permt material savings in cost of operation although the yield and purity show no material improvement over that obtainable by the Lacey process.

In the process of the present invention, just as in the Lacey process, an inert organic diluent is preferably used. The particular diluent is not critical and any inert or substantially inert organic solvent or diluent may be used. This is an advantage because the diluent can be chosen to fit economic conditions and it is not necessary to use the more expensive diluents or solvents, such as heterocyclic bases although they can be effectively employed in the present invention which is in no way limited to any particular solvent or diluent. Because of the above advantage, I prefer to use the cheap organic diluents among which nitrobenzene is very useful, because it is not only cheap, but its boiling point corresponds closely to the preferred temperature of reaction and it can therefore be used effectively as an internal thermostat by causing it to boil gently. Other organic solvents such as di- or trichlorbenzene may be employed and it is an advantage of the present invention that the solvents are easily recovered because when the reaction is over the pigment formed is filtered off and washed with the solvent used. The solvent is then recovered from the mother liquor by stripping it off with steam, or by any other suitable method.

The present invention is applicable to the production of copper compounds of the phthalocyanine type from aromatic o-dinitriles generally in which the nitriles may be carbocyclic or heterocyclic. As examples of such nitriles there may be mentioned, phthalonitrile, 3,4 - dimethylphthalonitrile, 4-phenyl phthalonitrile, 4-chlorophthalonitrile, 4,5-dichlorophthalonitrile, 3-nitrophthalonitrile, 4-ethoxyphthalonitrile, 4-acetaminophthalonitrile, 3,4-dicyanobenzophenone, 2,3-dicyanofluorenone, 2,3-dicyanopyrazine, 2,3-dicyanodiphenylene oxide, 1,2-dicyanonaphthene, 6-methyl-2,3-dicyanoquinoxaline, 3,4-dicyano diphenyl, 2-(3',4'-dicyanophenyl)benzothiazole, dicyano phenyl pyridines.

The temperature to be used in the present process is not critical. However, best results are obtained around 200° C., for example, in a range between 180°–220° C. The reaction, however, proceeds at lower temperatures down to 120° C. and may be carried out at temperatures as high as 300° C. but in both cases the results become poorer as the temperature departs from the preferred range of 180–220° C.

Small amounts of the imide corresponding to the dinitrile appear to have a beneficial effect in thinning out the reaction charges and thus facilitates stirring, particularly when the reaction approaches completion. This permits using less diluent and increases the efficiency of the process. The amount of imide required to get this effect is not large and in the production of copper phthalocyanine it is sufficient to use a crude phthalonitrile which contains small amounts of phthalimide.

The yields obtained by the process of the present invention are excellent and approach theoretical even after the material has been purified by dissolving the pigment obtained in sulfuric acid and reprecepitating it by water.

The invention will be described in greater detail in conjunction with the following specific examples which are merely illustrative and are not in any way intended to limit the scope of the present invention to the details herein set forth. The parts in the examples are all by weight.

*Example 1*

302 parts of crude phthalonitrile (containing 288 parts real phthalonitrile and 14 parts of phthalimide), 7.5 parts phthalimide and 91 parts of anhydrous $CuSO_4$ are added to 1000 parts of nitrobenzene in an autoclave. The autoclave is first evacuated and then 65 parts of dry ammonia gas are added. The reaction mixture is heated rapidly with stirring to 210–215° C. and held at that temperature for two hours. The maximum pressure developed is 450#/sq. in. at 210° C. and the final pressure is 390#/sq. in.

The gases from the autoclave were anlyzed and found to contain approximately the theoretical amounts of nitrogen and ammonia (excess).

The charge is then filtered hot and the nitrobenzene is recovered from the filter cake by steam distillation. The pigment is again filtered and washed with hot water. The filtrate contains ammonium sulfate and a small amount of copper salts. The crude pigment is then purified as usual by dissolving in concentrated $H_2SO_4$ and precipitating in water.

The yield of purified pigment is practically equal to the theoretical yield.

When 166 parts of the anhydrous double salt $CuSO_4(NH_4)_2SO_4$ are substituted for the 91 parts of the anhydrous $CuSO_4$ in the above example, a pigment of equal quality and approximately the same yield is obtained.

*Example 2*

53 parts of 1,2-dicyanonaphthalene, 13 parts of anhydrous $CuSO_4$ and 2 parts of phthalimide are slurried in 100 parts of nitrobenzene in an autoclave. The autoclave is first evacuated and then sufficient dry ammonia gas is added to reduce all of the sulfate ions present and react with it to form ammonium sulfate, together with a small excess. The reaction mixture is then heated rapidly to 210–215° C. with stirring and maintaining at this temperature for five hours. The product is filtered hot and washed with methyl alcohol and hot water and dried. The dry pigment is then purified by dissolving in concentrated sulfuric acid and precipitating in water. An olive green pigment is obtained in good yield.

*Example 3*

59 parts of 6-methyl-2,3-dicyanoquinoxaline are used in place of the 53 parts of 1,2-dicyanonaphthalene in Example 2. The product is worked up as in Example 2 and a dark green pigment is obtained in good yield.

We claim:

1. A method of producing a pigment of the copper phthalocyanine type which comprises reacting an aromatic o-dinitrile with anhydrous cupric sulfate in the presence of a practically inert organic diluent liquid and in the presence of at least sufficient ammonia to combine with the sulfate anion set free in the reaction to produce ammonium sulfate and nitrogen, the reaction being carried out in an autoclave under the autogenous pressure of the volatile constituents.

2. A method of producing copper phthalocyanine which comprises reacting phthalonitrile with anhydrous cupric sulfate in the presence of a practically inert organic diluent liquid and in the presence of at least sufficient ammonia to combine with the sulfate anion set free in the reaction to produce ammonium sulfate and nitrogen, the reaction being carried out in an autoclave under the autogenous pressure of the volatile constituents.

3. A method of producing a pigment of the copper phthalocyanine type which comprises reacting at 180–220° C. an aromatic o-dinitrile with anhydrous cupric sulfate in the presence of a practically inert organic diluent liquid and in the presence of at least sufficient ammonia to combine with the sulfate anion set free in the reaction to produce ammonium sulfate and nitrogen, the reaction being carried out in an autoclave under the autogenous pressure of the volatile constituents.

4. A method of producing copper phthalocyanine which comprises reacting at 180–220° C.

phthalonitrile with anhydrous cupric sulfate in the presence of a practically inert organic diluent liquid and in the presence of at least sufficient ammonia to combine with the sulfate anion set free in the reaction to produce ammonium sulfate and nitrogen, the reaction being carried out in an autoclave under the autogenous pressure of the volatile constituents.

5. A method of producing a pigment of the copper phthalocyanine type which comprises reacting an aromatic o-dinitrile with anhydrous cupric sulfate in the presence of nitrobenzene and in the presence of at least sufficient ammonia to combine with the sulfate anion set free in the reaction to produce ammonium sulfate and nitrogen, the reaction being carried out in an autoclave under the autogenous pressure of the volatile constituents.

6. A method of producing copper phthalocyanine which comprises reacting phthalonitrile with anhydrous cupric sulfate in the presence of nitrobenzene and in the presence of at least sufficient ammonia to combine with the sulfate anion set free in the reaction to produce ammonium sulfate and nitrogen, the reaction being carried out in an autoclave under the autogenous pressure of the volatile constituents.

7. A method of producing a pigment of the copper phthalocyanine type which comprises reacting at 180–220° C. an aromatic o-dinitrile with anhydrous cupric sulfate in the presence of nitrobenzene and in the presence of at least sufficient ammonia to combine with the sulfate anion set free in the reaction to produce ammonium sulfate and nitrogen, the reaction being carried out in an autoclave under the autogenous pressure of the volatile constituents.

8. A method of producing copper phthalocyanine which comprises reacting at 180–220° C. phthalonitrile with anhydrous cupric sulfate in the presence of nitrobenzene and in the presence of at least sufficient ammonia to combine with the sulfate anion set free in the reaction to produce ammonium sulfate and nitrogen, the reaction being carried out in an autoclave under the autogenous pressure of the volatile constituents.

9. A method according to claim 2 in which sufficient phthalimide is present to reduce the viscosity of the reaction mixture.

VICTOR L. KING.
JAMES W. FOOTE.
DON H. W. FELCH.